(12) United States Patent
Ito et al.

(10) Patent No.: US 6,617,807 B2
(45) Date of Patent: Sep. 9, 2003

(54) DISCHARGE LAMP LIGHTING CIRCUIT FOR A PLURALITY OF DISCHARGE LAMPS

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/075,817

(22) Filed: Feb. 13, 2002

(65) Prior Publication Data

US 2002/0117972 A1 Aug. 29, 2002

(30) Foreign Application Priority Data

Feb. 14, 2001 (JP) .................................. P. 2001-036958

(51) Int. Cl.[7] .............................................. H05B 41/16
(52) U.S. Cl. .................. 315/276; 315/277; 315/209 R; 315/220; 315/223
(58) Field of Search .............................. 315/276, 277, 315/209 R, 212, 213, 220, 209 CD, 2 UG, 254, 255, 312, 326, DIG. 5, DIG. 7, 223, 219

(56) References Cited

U.S. PATENT DOCUMENTS 4,293,799 A * 10/1981 Roberts ....................... 315/256
6,320,329 B1 * 11/2001 Wacyk ........................ 315/291
6,366,030 B1 * 4/2002 Ito et al. ..................... 315/291

FOREIGN PATENT DOCUMENTS

| JP | 2001-006888 | 1/2001 |
| JP | 2001-006890 | 1/2001 |
| JP | 2001-203086 | 7/2001 |
| JP | 2001-203087 | 7/2001 |

* cited by examiner

*Primary Examiner*—Don Wong
*Assistant Examiner*—Tuyet T. Vo
(74) *Attorney, Agent, or Firm*—Fish & Richardson P.C.

(57) ABSTRACT

In a discharge-lamp lighting circuit for turning on a plurality of discharge lamps, starting circuits 8 for supplying starting pulses to the respective discharge lamps are provided. Each starting circuit 8 has transformers T1 and T2 equal in number to the discharge lamps and each of the transformers has a primary and a secondary winding. The discharge lamps $6\_1$ and $6\_2$ are connected to the respective secondary windings T1s and T2s. Capacitors C1 and C2 are connected to the respective primary windings T1$p$ and T2$p$ of the transformers and one switch element SW is provided in a circuit including the primary windings and the capacitors. When the accumulated charge in each capacitor is discharged via the primary winding of the transformer as the switch element SW conducts, the starting pulse is generated and supplied to each discharge lamp via the secondary winding of each transformer.

11 Claims, 8 Drawing Sheets

DISCHARGE LAMP LIGHTING CIRCUIT FOR A PLURALITY OF DISCHARGE LAMPS

BACKGROUND OF THE INVENTION

The present invention relates to a discharge-lamp lighting circuit for lighting a plurality of discharge lamps and more particularly to the art of simplifying a starting circuit configuration as well as guaranteeing the performance of turning on each discharge lamp.

In case where a discharge lamp (metallic halide lamp) is applied to, for example, the light source of a vehicle lamp, there is a known lighting circuit configuration comprising a DC power supply, a power supply portion (switching power supply circuit), a DC-AC converter circuit, a starting circuit and so on.

A starting circuit (so-called starter circuit) for generating a high-tension starting pulse is needed when a discharge lamp is started and in case where a plurality of discharge lamps are turned on by a lighting circuit common to these discharge lamps, each starting circuit is provided corresponding to each discharge lamp.

A typical starting circuit configuration comprises a capacitor for accumulating electric charge and a switch element (a thyristor element or a spark gap element) for discharging the charge, both of the capacitor and the switch element being provided in a primary-side circuit including the primary winding of a transformer (trigger transformer), and the pulse generated by the conduction of the switch element is boosted by the transformer, so that the starting pulse is supplied from the secondary winding to a discharge lamp.

In the form of providing the starting circuit to each discharge lamp, the number of parts for use increases in proportion to an increase in the number of discharge lamps and this is problematical in view of size and cost reduction.

In case where such a switch element is provided in the primary-side circuit of the transformer forming the starting circuit, for example, it is necessary to provide switch elements equal in number to discharge lamps.

In order to provide a starting circuit for common use, the primary-side circuit of transformers is set for common use; for example, the primary-side circuit of the transformers is formed with one circuit including a primary winding, a capacitor and a switch element, and simultaneously secondary windings equal in number to discharge lamps are provided on the secondary side of the transformers. Then the number of parts for use can be curtailed by supplying the staring pulse to the individual discharge lamp via each secondary winding.

According to this method, however, it has been proved necessary to take the following matters into consideration so that the discharge lamp is turned on safely and certainly.

(1) The capacitance of the capacitor forming the primary-side circuit of the transformers is capacitance resulting from multiplying the capacitance which is necessary when one discharge lamp is turned on by the number of discharge lamps and the characteristics immediately after the breakdown of the discharge lamps conform to one another.

(2) The capacitance of the capacitor forming the primary-side circuit of the transformers is equal to or greater than twice as capacitance resulting from multiplying the capacitance which is necessary when one discharge lamp is turned on by the number of discharge lamps.

When the subject (1) is adopted first, there remains a problem arising from checking a reduction in costs to the extent that the capacitance of the capacitor increases as far as the first half portion of the reason is concerned. With regard to the second half portion of the reason (that the characteristics immediately after the breakdown of the discharge lamps need to conform to one another), it is owning to the fact that the energy stored in the capacitor has to be equally distributed. More specifically, the energy is supplied to the discharge lamp in an instant the breakdown of the discharge lamp occurs and plays an important role in controlling stably shifting toward turning on the discharge lamp. Unless the characteristics of the discharge lamps conform to one another in case where the breakdown of the whole discharge lamp occurs when the starting pulse is supplied, there develops partiality in that greater energy is distributed to a certain discharge lamp, whereas less energy is distributed to another. Consequently, the discharge lamp that has received less energy can hardly stably shift to its ON state. In order to obviate such a condition of the discharge lamp, it is only needed to selectively use discharge lamps whose characteristics conform to one another. However, difficulties in sorting man-days and schedule control still remain to be solved.

The subject (2) is intended to supply energy sufficient to make even the discharge lamp that has received less energy stably shift to its ON state on the assumption that the distribution of energy to each discharge lamp is unequal. In other words, the capacitor is stored with a somewhat larger quantity of energy beforehand and caused to discharge the energy by the conduction of the switch element. Notwithstanding, this method requires a large-capacity capacitor to be fully recharged in a short time so that a high-tension pulse is generated. Moreover, it is needed to not solely add a regulating or control circuit for stably turning on each discharge lamp to the discharge lamp supplied with greater energy but also employ a large-capacity capacitor. The problem in this case is that the lighting circuit tends to become large-sized, which results in an increase in costs.

SUMMARY OF THE INVENTION

An object of invention is to not only improve lighting performance of a discharge-lamp lighting circuit by allowing a plurality of discharge lamps to stably shift to their ON state after the discharge lamps are started but also decrease the size and cost of the discharge-lamp lighting circuit.

In order to solve the problem above according to the invention, a discharge-lamp lighting circuit for turning on a plurality of discharge lamps, comprising a starting circuit for supplying starting pulses to discharge lamps has the following configuration.

The starting circuit is provided with transformers having primary and secondary windings equal in number to the discharge lamps, the discharge lamps being connected to the respective secondary winding.

One capacitor is connected to the primary winding of each transformer and a circuit including the capacitors and one switch element is provided on the primary side of the transformers.

When the accumulated charge in each capacitor is discharged via the primary winding of the transformer as the switch element conducts, the starting pulse is generated and supplied to each discharge lamp via the secondary winding of the transformer.

According to the invention, the primary winding of each transformer added to each discharge lamp has a capacitor so as to secure accumulated energy necessary for the discharge lamp to stably shift to its ON state and by providing the switch element for common use in the primary-side circuit of the transformers, the size and cost of the discharge-lamp lighting circuit can be decreased.

DETAILED DESCRIPTION OF THE DRAWINGS

Figure 1:
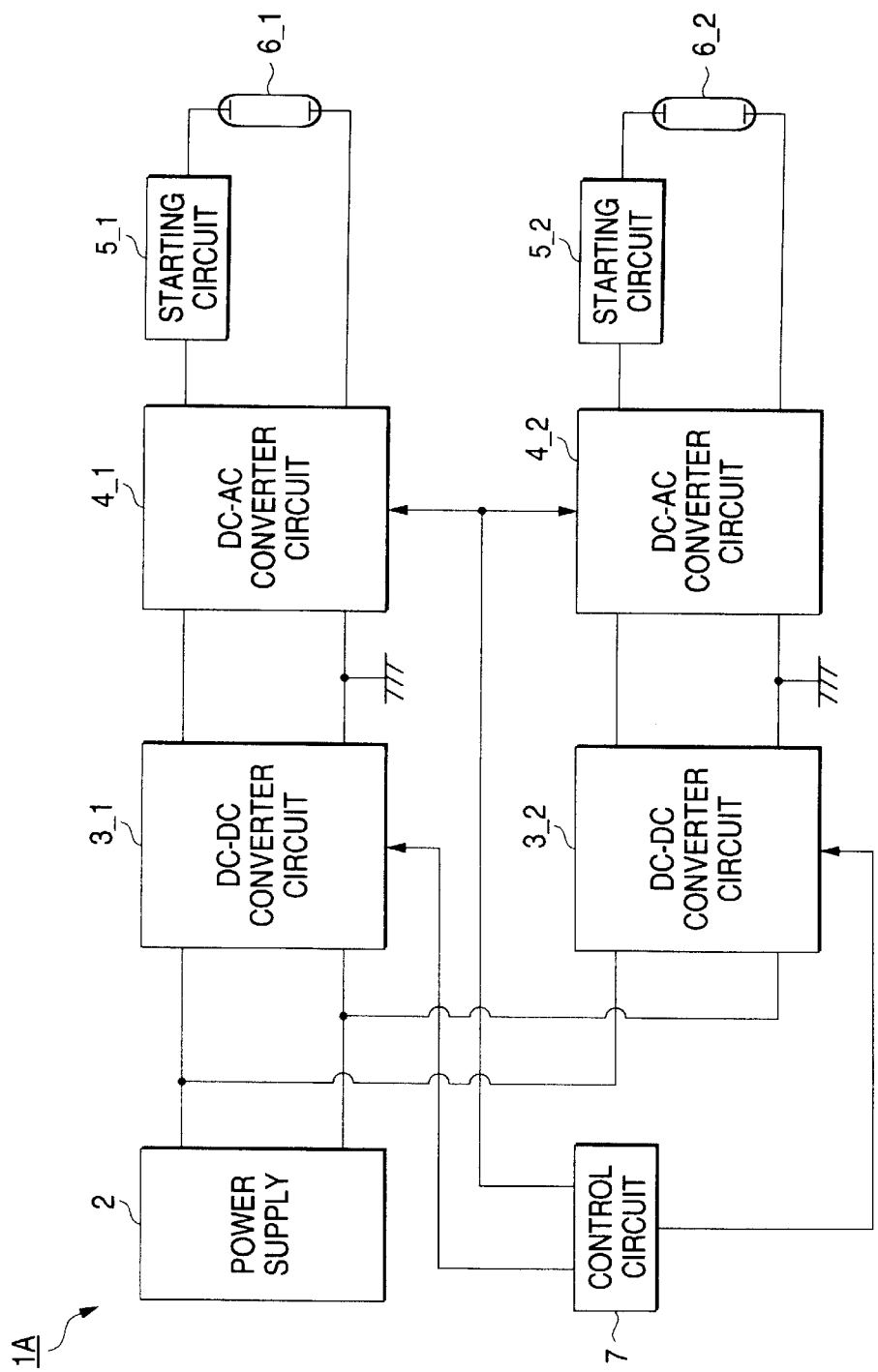
FIG. 1 is a block diagram showing the basic circuit configuration of the invention.
Figure 2:
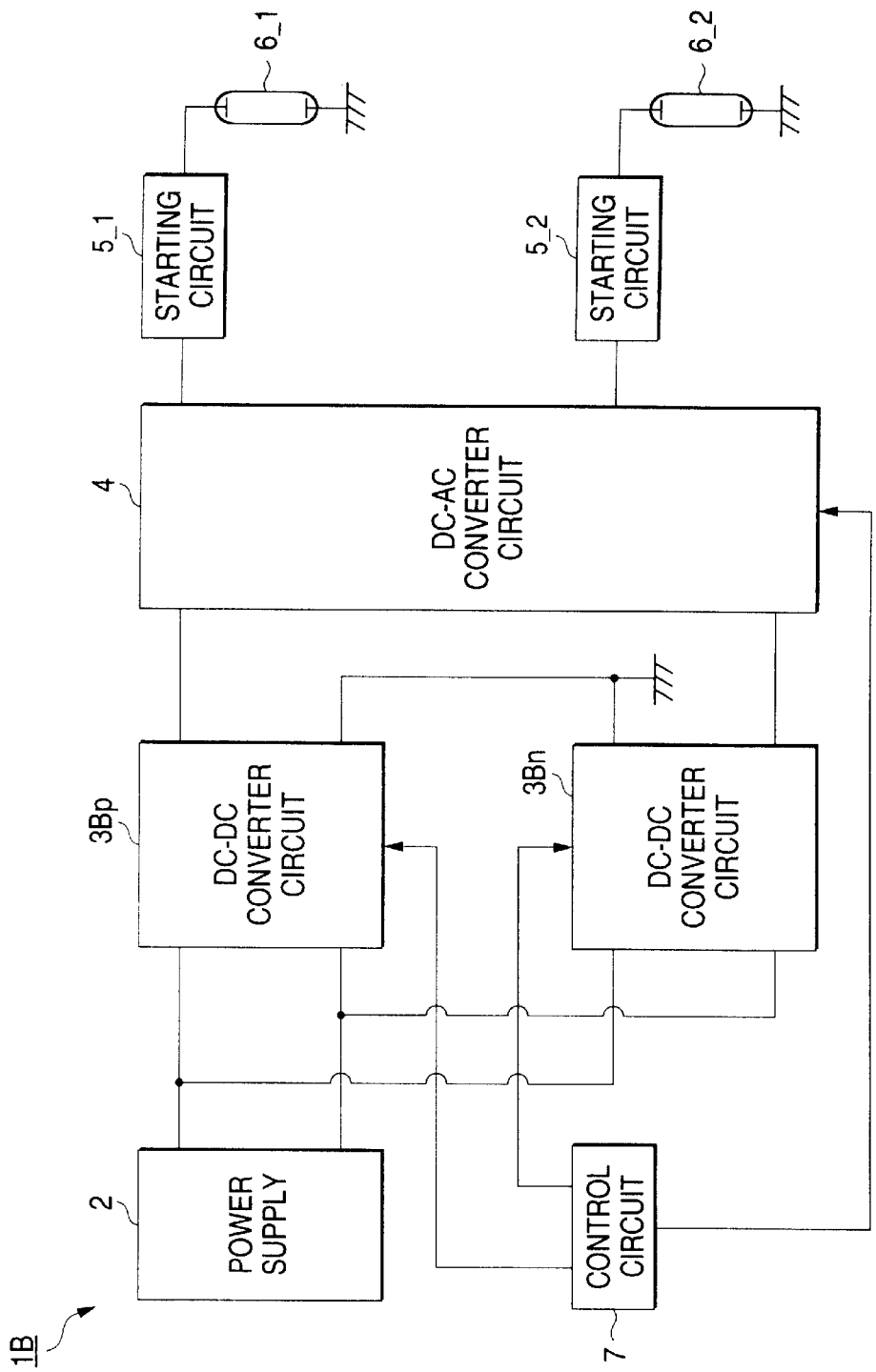
FIG. 2 is a block diagram showing another circuit configuration of the invention.

FIGS. 1 and 2 are diagrams explanatory of basic discharge-lamp lighting circuit configurations embodying the present invention.

As a lighting circuit for lighting two discharge lamps, for example, the following forms are named.

(A) A form of preparing two sets of circuits, each including a DC-DC converter circuit and a DC-AC converter circuit, whereby to control lighting of a discharge lamp in each circuit.

(B) A form of using a DC-DC converter circuit for obtaining a positive polarity output, a DC-DC converter circuit for obtaining a negative polarity output and one DC-AC converter circuit to turn on each of the two discharge lamps.

FIG. 1 shows the form (A) by way of example, wherein a lighting circuit 1A has the components shown below (with reference numerals).

DC power supply 2.
DC-DC converter circuits 3_1 and 3_2.
DC-AC converter circuits 4_1 and 4_2.
Starting circuits 5_1 and 5_2.
Discharge lamps 6_1 and 6_2.
Control circuit 7.

In the arrangement above, the DC-DC converter circuit 3_1, the DC-AC converter circuit 4_1 and the starting circuit 5_1 are provided as circuits for the discharge lamp 6_1, whereas the DC-DC converter circuit 3_2, the DC-AC converter circuit 4_2 and the starting circuit 5_2 are provided as those for the discharge lamp 6_2, the control circuit 7 being intended for common use therebetween.

More specifically, in the discharge-lamp lighting circuit 1A, DC voltage is supplied from the DC power supply 2 via a lighting switch (not shown) to the DC-DC converter circuits 3_1 and 3_2 and then the output voltages of the DC-DC converter circuits 3_1 and 3_2 are supplied to the respective DC-AC converter circuits 4_1 and 4_2. With regard to each DC-DC converter circuit, there is cited a circuit configuration for converting the DC input voltage to desired DC voltage; for example, a DC-DC converter circuit (of a chopper or fly-back type) configuration in the form of a switching regulator. The DC-AC converter circuit may be but not limited to a bridge type circuit (full- or half-bridge circuit).

The starting circuit (so-called starter circuit) 5_1 is a circuit for supplying a starting pulse to the discharge lamp 6_1 after superposing the starting pulse on the output of the DC-AC converter circuit 4_1. Further, the starting circuit 5_2 is a circuit for supplying a starting pulse to the discharge lamp 6_2 after superposing the starting pulse on the output of the DC-AC converter circuit 4_2.

The control circuit 7 is used to control each of the discharge lamps in accordance with the state of each discharge lamp so as to control the output voltage thereof by sending out the control signals intended for the respective DC-DC converter circuits 3_1 and 3_2 and to control the alternating operations by sending out the control signals intended for the respective DC-AC converter circuits 4_1 and 4_2.

FIG. 2 shows the form (B) by way of example, wherein a lighting circuit 1B has the components shown below (with reference numerals).

DC power supply 2.
DC-DC converter circuits 3Bp and 3Bn.
DC-AC converter circuit 4.
Starting circuits 5_1 and 5_2.
Discharge lamps 6_1 and 6_2.
Control circuit 7.

What makes the discharge-lamp lighting circuit 1B of FIG. 2 different from the discharge-lamp lighting circuit 1A of FIG. 2 includes the following.

With regard to the DC-DC converter circuits, the circuit portion 3Bp (DC-DC converter) for obtaining a positive polarity voltage output and the circuit portion 3Bn (DC-DC converter) for obtaining a negative polarity voltage output are disposed in parallel relation to each other.

The DC-AC converter circuit 4 is a circuit (full- or H-bridge circuit) for common use.

The control circuit 7 sends out control singles to the respective circuit portions 3Bp and 3Bm whereby to control the output voltage by performing the on-off control over the switching element in each circuit portion and also sends out a control signal to the DC-AC converter circuit 4 whereby to control the alternating operation.

Figure 3:
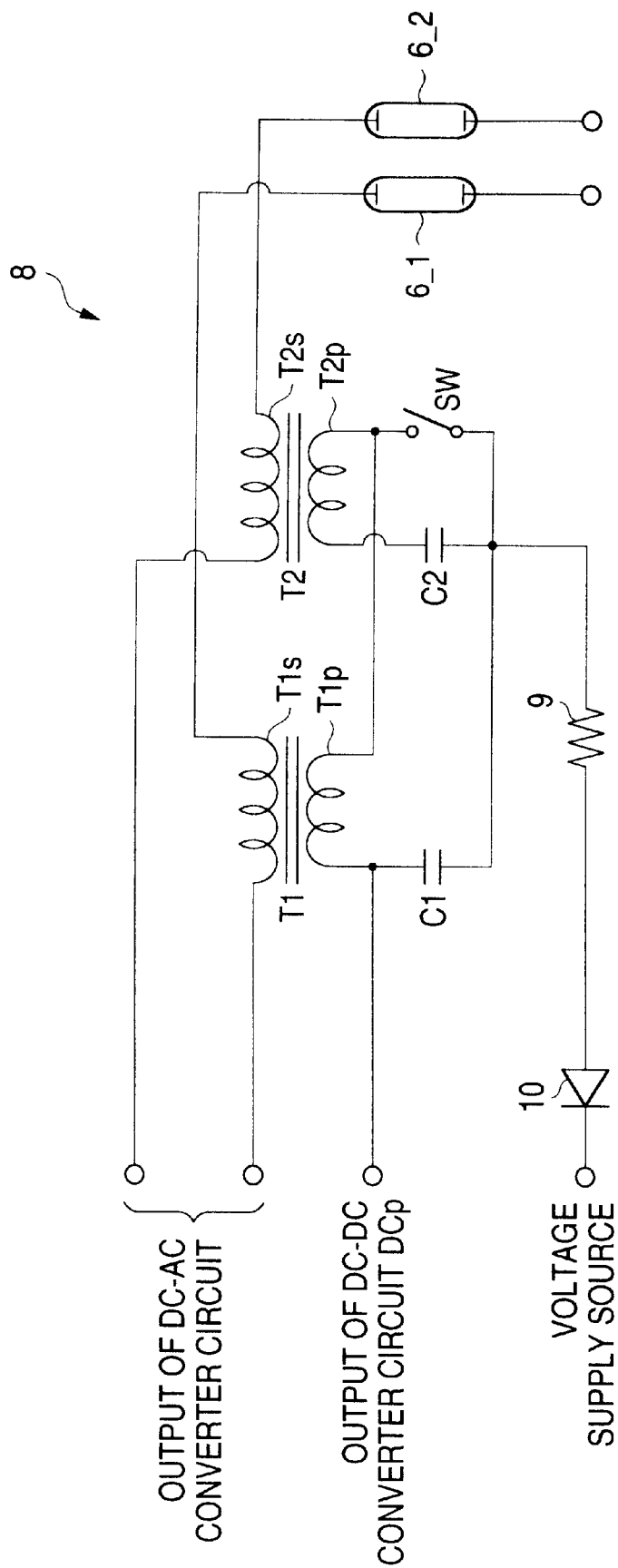
FIG. 3 is a circuit diagram showing the principal part of a starting circuit configuration.

FIG. 3 shows a starting circuit configuration 8 in consideration of its application to the lighting circuit.

In the starting circuit, one discharge lamp has one transformer (as two discharge lamps are provided according to this embodiment of the invention, two transformers T1 and T2 are provided). In other words, there are provided transformers T1 and T2 respectively having primary windings (T1$p$ and T2$p$) and secondary windings (T1$s$ and T2$s$) equal in number to the discharge lamps; for example, T1 is used to form the starting circuit 5_1 and T2 to form the starting circuit 5_2.

One end of the secondary winding T1$s$ is connected to one output terminal of the DC-AC converter circuit 4, for example, the other end being connected to the discharge lamp 6_1. Further, one end of the secondary winding T2$s$ is connected the other output terminal of the DC-AC converter circuit 4, the other end being connected to the discharge lamp 6_2. In other words, one ends of the respective secondary windings are connected to the DC-AC converter circuit, whereas the other ends thereof are connected to the discharge lamp.

A capacitor is connected to the primary winding of each transformer and as shown in FIG. 3, a capacitor C1 is connected to one end of the primary winding T1$p$ and a capacitor C2 is connected to one end of the primary winding T2$p$. The terminals of the respective primary windings without the capacitors connected thereto are connected together and these terminals are connected to a switch element SW (though simply shown by a switch symbol in FIG. 3, a separately excited element such as a thyristor or a self breakdown element such as a spark gap element is employed).

The output voltage (hereinafter called the 'DCp') of the DC-DC converter circuit 3Bp is supplied to the junction point between the primary winding T1$p$ and the capacitor C1, for example. Of the terminals of the capacitors C1 and C2 and the switch element SW, those which are not connected to the primary windings T1$p$ and T2$p$ are connected together and also connected to a voltage supply source (not shown) via a resistor 9 and a diode 10 (disposed with a direction opposite to the direction directed to the resistor 9 as the forward direction). With regard to the voltage supply source, a description of its specific form will be omitted as there are various kinds of known formation (e.g., refer to embodiments of the invention as will be described later).

As set forth above, a circuit including the capacitors C1 and C2 and one switch element SW is provided on the primary sides of the transformers T1 and T2. When current flows into the diode 10 according the relation between the potential of the DCp and the potential of the voltage supply source, the capacitors C1 and C2 are recharged and when the accumulated charge therein is discharged via the primary windings T1$p$ and T2$p$ of the transformers T1 and T2 as the switch elements SW conducts, the starting pulses are generated. Then the pulses are supplied to the respective discharge lamps 6_1 and 6_2 via the secondary windings T1$s$ and T2$s$ of the transformers T1 and T2.

As the arrangement above can be made only by dividing the magnetic material into two parts in each transformer, an increase in the size of the discharge lamp will not be brought about. Moreover, one transformer has one capacitor and as to the capacitance of each capacitor, it is only needed to set the capacitance so that each discharge lamp is stably shifted to its ON state, which does not result in increasing not only the capacitance of the capacitor more than necessary but also the size of the capacitor.

Moreover, the provision of the switch element SW for common use is advantageous in view of cost-saving since it is unnecessary to use more than one element. When the switch element SW conducts, each of the capacitors is caused to discharge via the primary winding of each transformer and as the energy supplied to each discharge lamp equally becomes equivalent to the energy stored in each capacitor, energy can be supplied to each discharge lamp neither too much nor too little, so that the lighting performance of the discharge lamp can be ensured.

Figure 4:
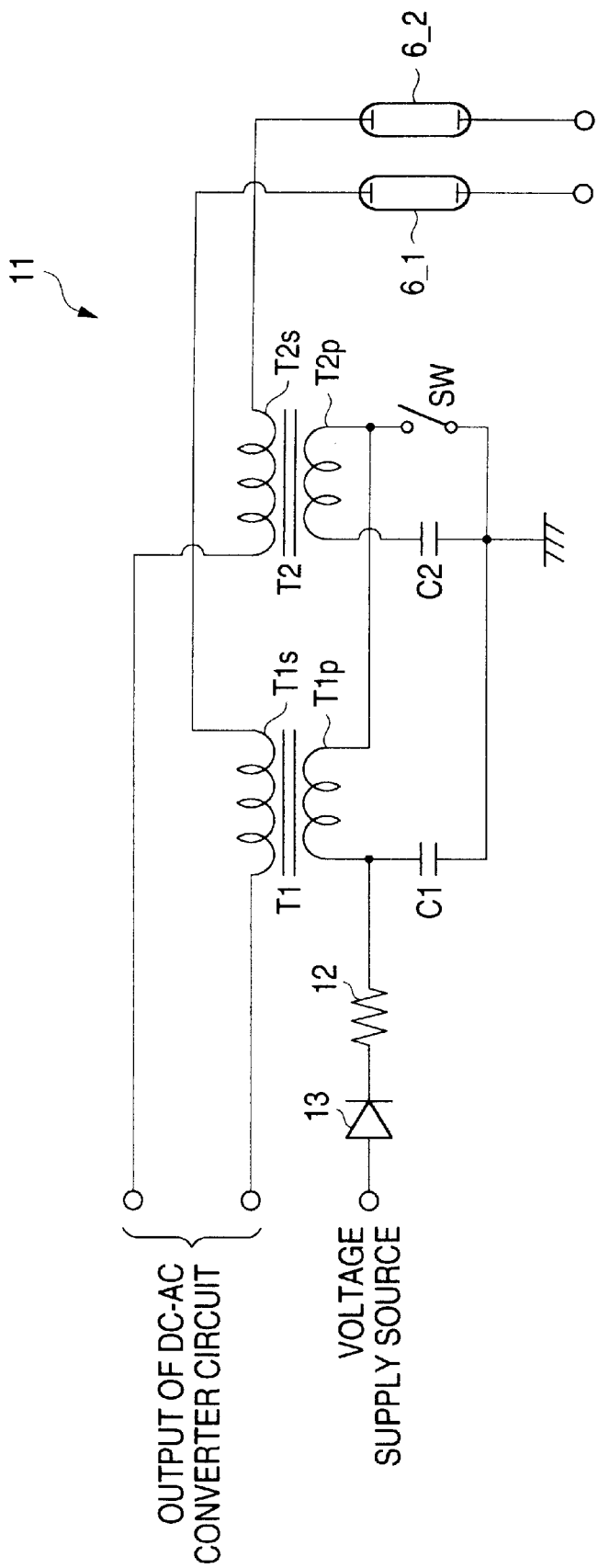
FIG. 4 is another circuit diagram showing the principal part of a starting circuit configuration.

FIG. 4 shows another starting circuit configuration 11 and what makes this circuit configuration different from the circuit configuration 8 includes the following.

The junction point between the primary winding T1$p$ of the transformer T1 and the capacitor C1 is connected to the voltage supply source (not shown) via a resistor 12 and a diode 13 (disposed with the direction directed to the resistor 12 as the forward direction).

Of the terminals of the capacitors C1 and C2 and the switch element SW, those which are not connected to the primary windings of the respective transformers are connected together and also grounded.

In comparison with the arrangement in which the starting circuits similar in configuration to each other are attached to the respective discharge lamp, size and cost reduction is made possible by providing the switch element for common use according to this embodiment of the invention. Moreover, in comparison with the provision of the primary side circuit for common use, this embodiment of the invention has the merit of not only assuring the lighting performance of each discharge lamp but also stably shifting the discharge lamp to its ON state after starting.

As described above, though two of the discharge lamps are provided for convenience, it is needless to say acceptable to apply the generalized contents of the invention to a lighting circuit having three or more of discharge lamps (with regard to one transformer, one capacitor is connected to its primary winding, and one ends of primary windings are connected together and moreover one switch element is connected therebetween).

EXAMPLES

Figure 5:
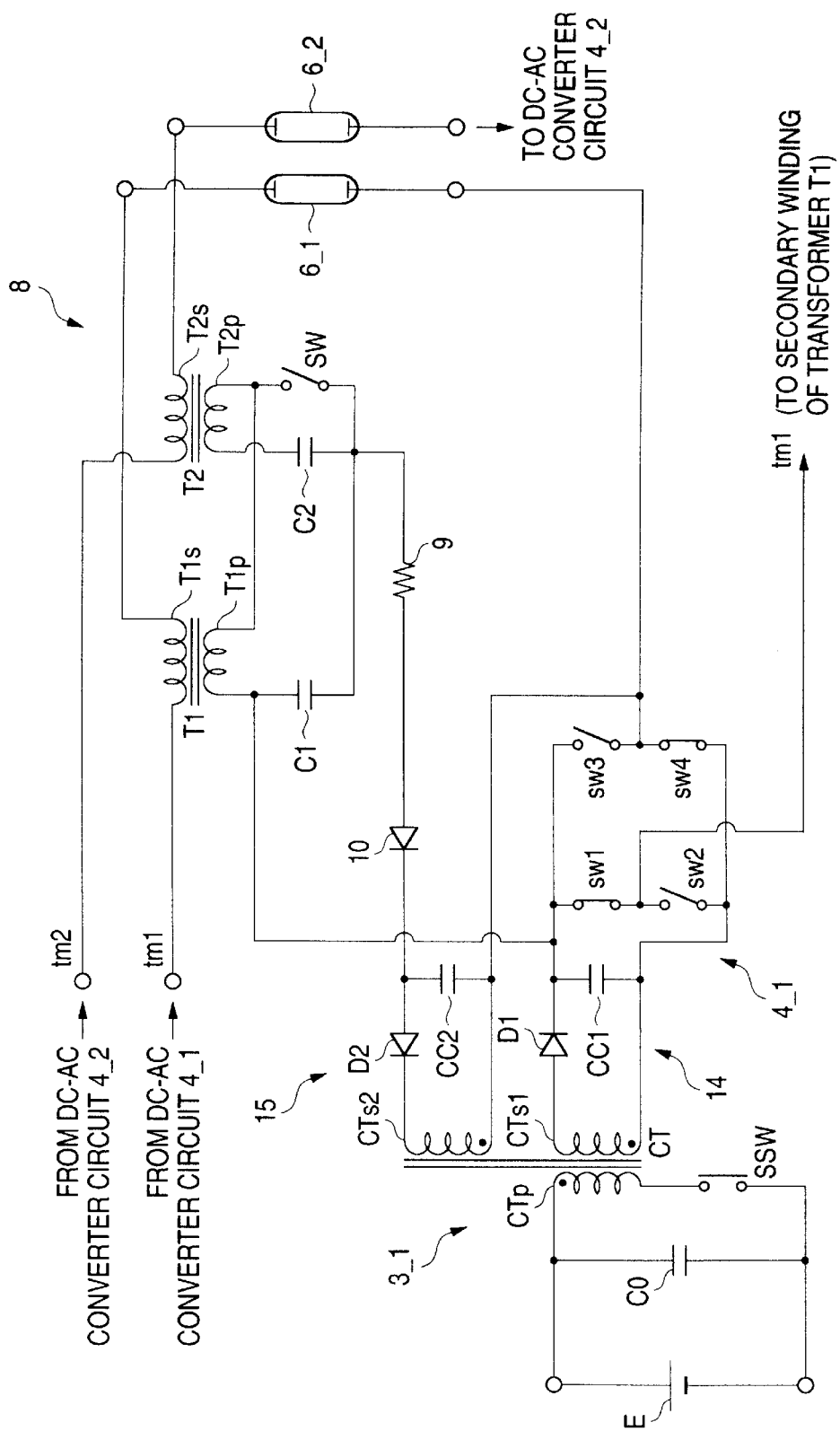
FIG. 5 is a circuit diagram embodying the invention together with FIGS. 6 to 8 and showing the application of the circuit configuration of FIG. 3 to the circuit of FIG. 1.

FIG. 5 shows the principal part of the starting circuit configuration 8 of FIG. 3 applied to the discharge-lamp lighting circuit of FIG. 1. Although only the formation of one 6_1 of the two discharge lamps 6_1 and 6_2 in FIG. 5 will be described herein, the circuit portion of the other discharge lamp 6_2 excluding a voltage supply source has a similar configuration (the description thereof will be omitted to avoid complication).

A DC-DC converter circuit 3_1 for receiving power from a DC power supply E has a transformer CT, a semiconductor switch element ssw and rectifier smoothing circuits 14 and 15. More specifically, the switch element ssw (though shown by a switch symbol in FIG. 5, a field effect transistor is employed) is connected to the primary winding CTp of the transformer CT, a capacitor C0 being connected to these components in parallel.

Of the two secondary windings CTs1 and CTs2, the CTs1 is has a rectifier smoothing circuit 14 including a diode D1 and a capacitor CC1. The anode of the diode D1 is connected to one end of the secondary winding CTs1 and the cathode thereof is connected to one end of the capacitor CC1, the other end of the capacitor being connected to the other end of the secondary winding CTs1. Further, the terminal voltage of the capacitor CC1 is sent out to a DC-AC converter circuit 4_1.

The other secondary winding CTs2 has the rectifier smoothing circuit 15 including the diode D1 and the capacitor CC1. The cathode of the diode D2 is connected to one end of the secondary winding CTs1 and the anode thereof is connected to one end of the capacitor CC2, the other end of the capacitor being connected to the other end of the secondary winding CTs2. Further, a circuit including the secondary winding CTs2 and the rectifier smoothing circuit 15 forms the voltage supply source.

The DC-AC converter circuit 4_1 has the full-bridge type configuration wherein four semiconductor switching elements sw1 to sw4 (though shown by switch symbols in FIG. 5, field effect transistors are employed) are subjected to switching control by control signals from a driving circuit (not shown) More specifically, the switching elements sw1 and sw4 are used in combination and the switching elements sw2 and sw3 are also used in combination, and these combinations of switching elements are alternately on-off controlled, whereby the alternating operation is performed. In this case, one output of the DC-AC converter circuit 4_1 is fetched from the junction point between the switching elements sw1 and sw2 and supplied to the discharge lamp 6_1 via the secondary winding T1s of the transformer T1 of the starting circuit 8 (see the terminal tm1). Moreover, the other output thereof is fetched from the junction point between the switching elements sw1 and sw2 and the output terminal concerned with the output is connected to one end of the discharge lamp 6_1 and to the junction point between the capacitor CC2 and the secondary winding CTs2.

The junction point between the diode D2 and the capacitor CC2 forming the voltage supply source is connected to the capacitors C1 and C2 of the starting circuit 8 via the diode 10 and the resistor 9. As the output of a rectifier smoothing circuit 14 (see the junction point between the diode D1 and the capacitor CC1) is supplied to the junction point between the capacitor C1 and the primary winding T1p of the starting circuit 8, the capacitors C1 and C2 in the starting circuit 8 are recharged and stored with the charge by the potential difference between the output voltage of the DC-DC converter circuit 3_and the voltage supplied by the voltage supply source. The output of the DC-AC converter circuit 4_2 is supplied to a terminal tm2.

Figure 6:
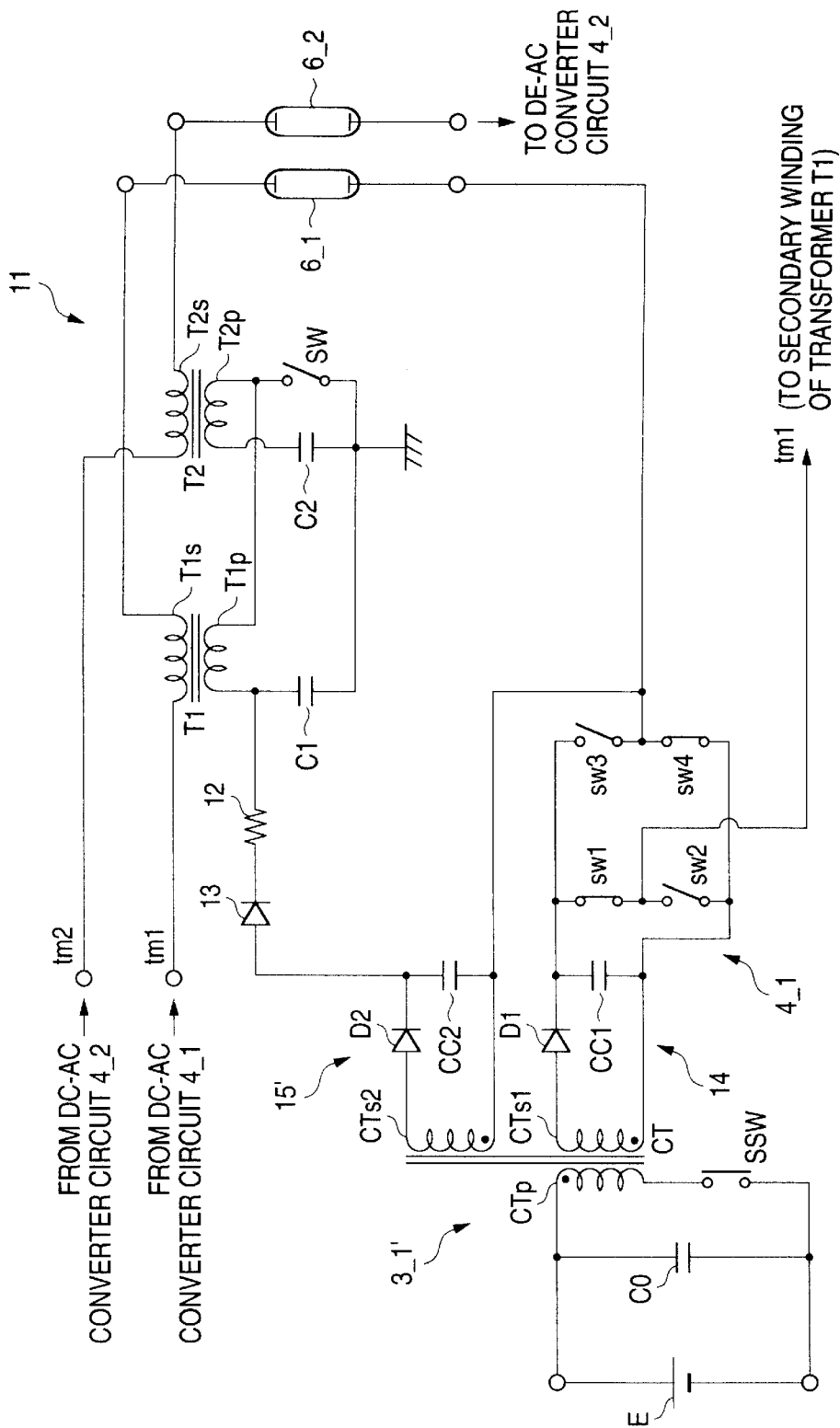
FIG. 6 is a circuit diagram showing the application of the circuit configuration of FIG. 4 to the circuit of FIG. 1.

FIG. 6 shows the principal part of the starting circuit configuration 11 of FIG. 4 applied to the discharge-lamp lighting circuit of FIG. 1. Although only the formation of one 6_1 of the two discharge lamps 6_1 and 6_2 in FIG. 6 will be described herein, the circuit portion of the other discharge lamp 6_2 excluding a voltage supply source has a similar configuration (the description thereof will be omitted to avoid complication)

What makes this circuit configuration different from the circuit configuration shown in FIG. 5 includes the following.

The direction of the diode D2 of a rectifier smoothing circuit 15' forming a voltage supply source in a DC-DC converter circuit 3_1' is set opposite to what is shown in FIG. 5 and the node of the diode D2 is connected to the secondary winding CTs2 and the cathode thereof to the capacitor CC2.

The junction point between the diode D2 and the capacitor CC2 is connected to the junction point between the capacitor C1 and the primary winding T1p of the starting circuit 11 via the diode 13 and the resistor 12.

Consequently, the capacitors C1 and C2 in the starting circuit 11 are recharged by the potential difference between the voltage supplied by the voltage supply source and the potential at the grounding line according to this embodiment of the invention.

Figure 7:
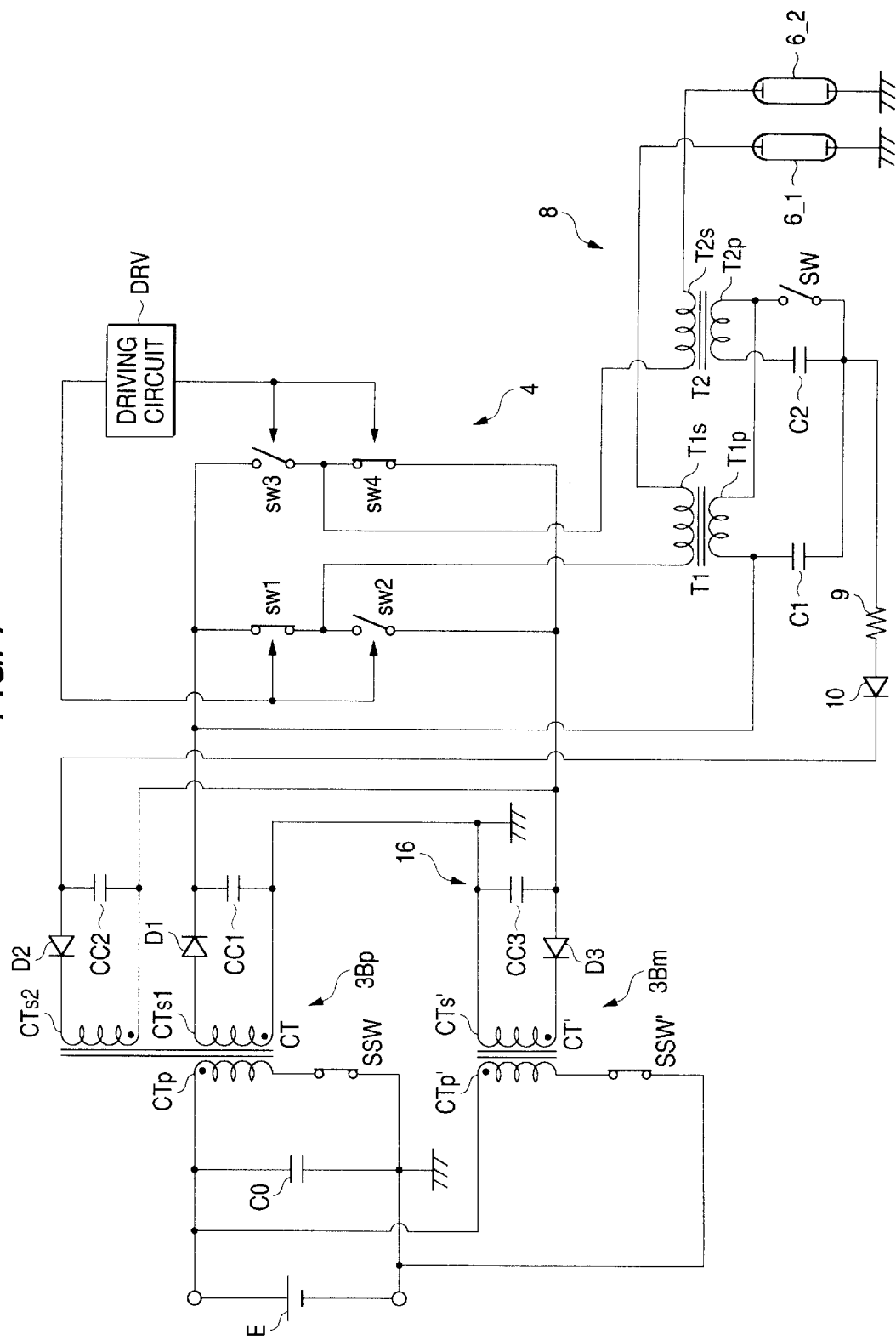
FIG. 7 is a circuit diagram showing the application of the circuit configuration of FIG. 3 to the circuit of FIG. 2.

FIG. 7 shows the principal part of the starting circuit configuration 8 of FIG. 3 applied to the discharge-lamp lighting circuit of FIG. 2.

According to this embodiment of the invention, the DC-DC converter circuit for receiving voltage input from the DC power supply E has circuit portions 3Bp and 3Bm.

Although the configuration of the circuit portion 3Bp is basically similar to that of the circuit portion 3_1, the circuit portion 3Bp has the following different points.

The junction point between the secondary winding CTs1 and the capacitor CC1 is grounded.

The junction point between the capacitor CC2 and the secondary winding CTs2 forming the voltage supply source is connected to the output terminal of the circuit portion 3Bm.

Further, the circuit portion 3Bm has a transformer CT', a switching element ssw' and a rectifier smoothing circuit 16, and the switching element ssw' (though shown by a switch symbol in FIG. 7, a field effect transistor is employed) is connected to the primary winding CTp' of the transformer CT'. The secondary winding CTs' has the rectifier smoothing circuit 16 including a diode D3 and a capacitor CC3. The cathode of the diode D3 is connected to one end of the secondary winding CTs' and the anode is connected to one end of the capacitor CC3. The other end of the capacitor CC3 is connected to the other end of the secondary winding CTs' and also grounded and the terminal voltage is sent out to the DC-AC converter circuit 4 at the following stage.

Although the DC-AC converter circuit 4 is similar to what is shown in FIG. 6 in that it is of the full-bridge type using four semiconductor switching elements sw1 to sw4, one ends of the elements sw1 and sw3 are connected to the cathode of the diode D1, whereas the other ends of the elements sw1 and sw3 are connected to the anode of the diode D3 via the elements sw2 and sw4. In this case, each switching element is on-off controlled by a signal from a driving circuit DRV.

According to the embodiment oft he invention, the output obtained from the junction point between the switching elements sw1 and sw2 is supplied to the discharge lamp 6_1 via the secondary winding T1s of the transformer Ti in the starting circuit 8 and the output obtained from the junction point between the switching elements sw3 and sw4 is supplied to the discharge lamp 6_2 via the secondary winding T2s of the transformer T2 in the starting circuit 8.

The junction point between the diode D2 and the capacitor CC2 forming the voltage supply source is connected to the capacitors C1 and C2 and the switch element SW via the diode 10 and the resistor 9, whereas the capacitors C1 and C2 in the starting circuit 8 are recharged by the potential difference between the output voltage of the circuit portion 3Bp and the voltage supplied by the voltage supply source.

Figure 8:
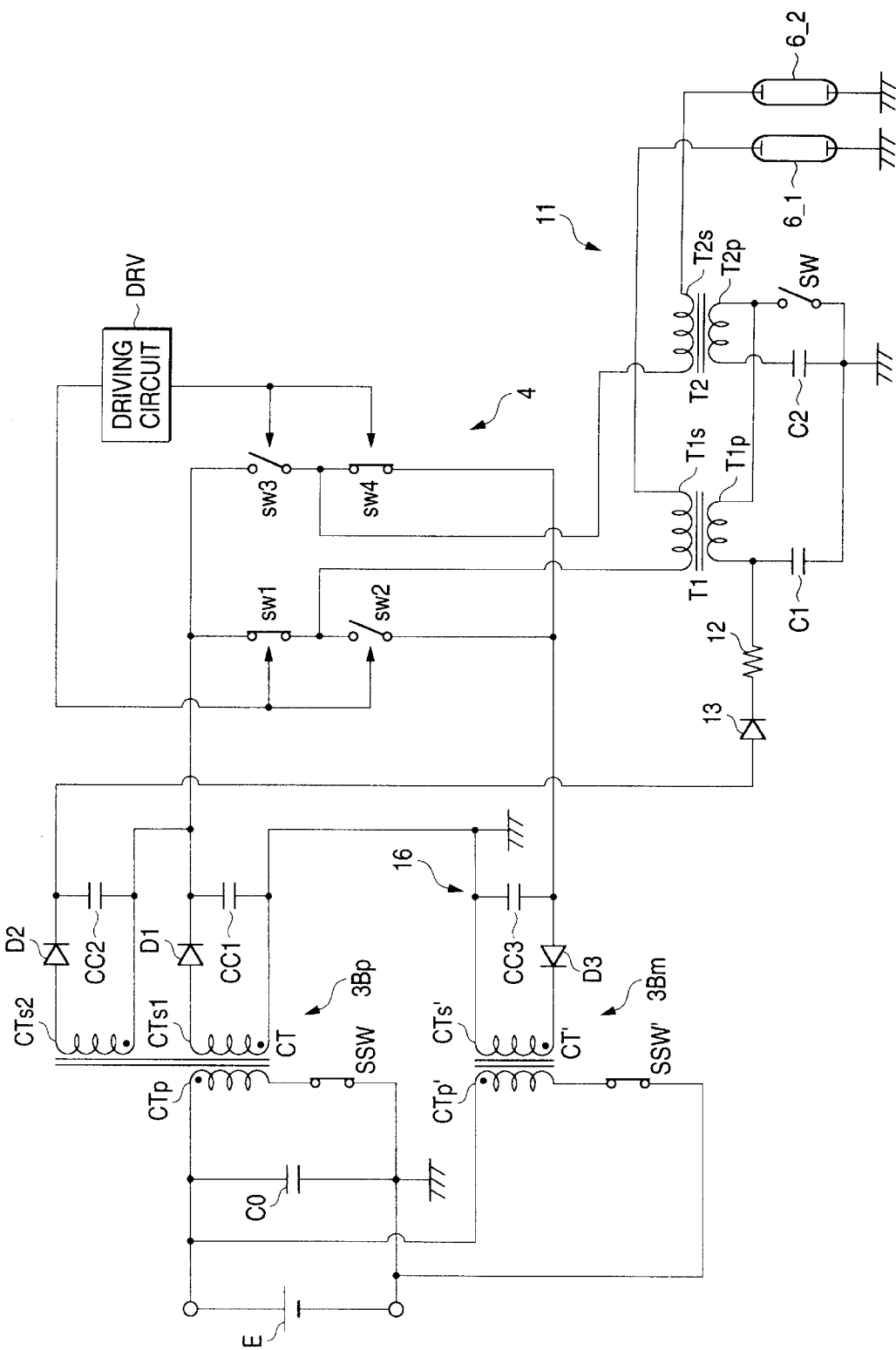
FIG. 8 is a circuit diagram showing the application of the circuit configuration of FIG. 4 to the circuit of FIG. 2.

FIG. 8 shows the principal part of the starting circuit configuration 11 of FIG. 4 applied to the discharge-lamp lighting circuit of FIG. 2.

What makes this circuit configuration different from the circuit configuration shown in FIG. 7 includes the following.

The direction of the diode D2 forming the voltage supply source is set opposite to what is shown in FIG. 7. The anode of the diode D2 is connected to the secondary winding CTs2 and the cathode thereof is connected to one end of the capacitor CC2.

The junction point between the diode D2 and the capacitor CC2 is connected to the junction point between the capacitor C1 and the primary winding T1p of the starting circuit 11 via the diode 13 and the resistor 12.

The junction point between the capacitor CC2 and the secondary winding CTs2 is connected to the output terminal (see the junction point between the diode D1 and the capacitor CC1) of the circuit portion 3Bp.

According to this embodiment of the invention, the capacitors C1 and C2 are recharged by the potential difference between the voltage supplied by the voltage supply source and the potential at the grounding line.

Although it has been arranged to obtain supply voltage necessary for recharging the capacitor by using the secondary winding attached to the transformer (converter), the invention is not limited to such an arrangement but includes various forms of obtaining the supply voltage by using a voltage multiplying rectifier and a charge pump type circuit and so on.

As obvious from the description given above, according to the invention, the primary winding of each transformer added to each discharge lamp has a capacitor so as to not only secure accumulated energy necessary for the discharge lamp to stably shift to its ON state but also guarantee the performance of turning on each discharge lamp, so that the use of a large-capacity capacitor does not endure. Moreover, by providing the switch element for common use in the primary-side circuit of the transformers, the size and cost of the discharge-lamp lighting circuit can be decreased.

According to the invention, it is possible to decrease dielectric strength with respect to the ground potential of a line connecting the starting circuit and the DC-DC converter circuit and a line connecting the starting circuit and the voltage supply source.

According to the invention, supply voltage necessary for recharging the capacitor in the starting circuit is easy to secure with the effect of simplifying the starting circuit configuration.

What is claimed is:

1. A discharge-lamp lighting circuit for turning on a plurality of discharge lamps, comprising:

starting circuits for supplying starting pulses to the respective discharge lamps, said starting circuit including:

a plurality of transformers equal in number to the discharge lamps, each of the transformers having a primary and a secondary winding connected to the respective discharge lamps; and a circuit provided on the primary side of the transformer, including a plurality of capacitors having a first end and second end, each first end being connected to a terminal of the primary winding of corresponding transformer, and the second end being connected to a pole of a single switch element, wherein, when the accumulated charge in each capacitor is discharged via the primary winding of the transformer as the switch element conducts, the starting pulse is generated and supplied to the discharge lamp via the secondary winding of the transformer.

2. A discharge-lamp lighting circuit for turning on a plurality of discharge lamps, comprising:

starting circuits for supplying starting pulses to the respective discharge lamps said starting circuit including:

a plurality of transformers equal in number to the discharge lamps, each of the transformers having a primary and a secondary winding connected to the respective discharge lamps; and a circuit provided on the primary side of the transformer, including a plurality of capacitors having a first end and second end, each first end being connected to a terminal of the primary winding of corresponding transformer, and the second end being connected to a pole of a single switch element, wherein when the accumulated charge in each capacitor is discharged via the primary winding of the transformer as the switch element conducts, the starting pulse is generated and supplied to the discharge lamp via the secondary winding of the transformer;

DC-DC converter circuits for converting DC input voltage to desired DC voltage and outputting the DC voltage; and a voltage supply source for supplying voltage to the starting circuits, wherein electric charge is accumulated in the capacitor in each starting circuit because of the potential difference between the output voltage of the DC-DC converter circuit and the voltage supplied by the voltage supply source.

3. The discharge lamp lighting circuit according to claim 2, further comprising a plurality of DC-AC converting circuits for respectively supplying a power to said discharge lamps, wherein each discharge lamp is lightened by each set of the DC-DC converting circuit and the DC-AC converting circuit.

4. The discharge lamp lighting circuit according to claim 3, wherein a first circuit for first discharge lamp includes a first DC-DC converting circuit, a first DC-AC converting circuit, and a first starting circuit, and for a second circuit for second discharge lamp includes a second DC-DC converting circuit, a second DC-AC converting circuit, and a second starting circuit, and a control circuit is commonly provided.

5. The discharge lamp lighting circuit according to claim 2, further comprising a DC-AC converting circuit for supplying a power to said discharge lamps, wherein two discharge lamp are lighted using a DC-DC converting circuit obtaining positive pole output, a DC-DC converting circuit obtaining negative pole output, and one DC-AC converting circuit.

6. The discharge lamp lighting circuit according to claim 5, wherein said DC-DC converting circuits are arranged in parallel each other, and said control circuit sends control signals to the DC-DC converting circuits, respectively, to control ON/OFF of the switching elements in the circuits, and further sends control signal to the DC-AC converting circuit so as to control alternative operation.

7. A discharge-lamp lighting circuit for turning on a plurality of discharge lamps, comprising:

starting circuits for supplying starting pulses to the respective discharge lamps, said starting circuit including:

a plurality of transformers equal in number to the discharge lamps, each of the transformers having a primary and a secondary winding connected to the respective discharge lamps; and a circuit provided on the primary side of the transformer, including a plurality of capacitors having a first end and second end, each first end being connected to a terminal of the primary winding of corresponding transformer, and the second end being connected to a pole of a single switch element, wherein when the accumulated charge in each capacitor is discharged via the primary winding of the transformer as the switch element conducts, the starting pulse is generated and supplied to the discharge lamp via the secondary winding of the transformer; and a voltage supply source for supplying voltage to the starting circuits, wherein electric charge is accumulated in the capacitor in each starting circuit because of the potential difference between the voltage supplied by the voltage supply source and the potential at the grounding line.

8. The discharge lamp lighting circuit according to claim 7, wherein two sets of circuits, each including a DC-DC converter circuit and a DC-AC converter circuit, are provided to control lighting of a discharge lamp in each circuit.

9. The discharge lamp lighting circuit according to claim 8, wherein a first circuit for first discharge lamp includes a first DC-DC converting circuit, a first DC-AC converting circuit, and a first starting circuit, and for a second circuit for second discharge lamp includes a second DC-DC converting circuit, a second DC-AC converting circuit, and a second starting circuit, and a control circuit is commonly provided.

10. The discharge lamp lighting circuit according to claim 7, wherein a DC-DC converter circuit for obtaining a positive polarity output, a DC-DC converter circuit for obtaining negative polarity output and one DC-AC converter circuit are provided to turn on each of the two discharge lamps.

11. The discharge lamp lighting circuit according to claim 10, wherein said DC-DC converting circuits are arranged in parallel each other, and said control circuit sends control signals to the DC-DC converting circuits, respectively, to control ON/OFF of the switching elements in the circuits, and further sends control signal to the DC-AC converting circuit so as to control alternative operation.

* * * * *